United States Patent
Meda

(10) Patent No.: US 6,728,542 B2
(45) Date of Patent: Apr. 27, 2004

(54) WIRELESS COMMUNICATIONS SYSTEM AND METHOD WITH IMPROVED SAFETY FEATURE FOR PREVENTING CALLS TO MOBILE UNIT WHEN TRAVELING

(75) Inventor: Rajasekhar Meda, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 467 days.

(21) Appl. No.: 09/854,915

(22) Filed: May 14, 2001

(65) Prior Publication Data

US 2002/0168981 A1 Nov. 14, 2002

(51) Int. Cl.$^7$ .................................. H04Q 7/20
(52) U.S. Cl. ................ 455/445; 455/412; 455/456; 455/466; 455/567
(58) Field of Search .................... 455/567, 401, 455/412, 517, 238.1, 440–441, 456–458, 425, 413, 422, 575, 67.1; 340/441

(56) References Cited

U.S. PATENT DOCUMENTS

| 5,787,348 | A | | 7/1998 | Willey et al. ............. 455/441 |
|---|---|---|---|---|
| 5,907,800 | A | | 5/1999 | Johnson et al. ........... 455/405 |
| 5,953,652 | A | | 9/1999 | Amin et al. .............. 455/410 |
| 6,006,096 | A | | 12/1999 | Trompower .............. 455/456 |
| 6,014,564 | A | | 1/2000 | Donis et al. ............. 455/436 |
| 6,014,566 | A | * | 1/2000 | Owada .................. 455/444 |
| 6,038,444 | A | * | 3/2000 | Schipper et al. ......... 455/421 |
| 6,108,532 | A | * | 8/2000 | Matsuda et al. .......... 455/413 |
| 6,124,810 | A | * | 9/2000 | Segal et al. ............ 340/994 |
| 6,128,327 | A | | 10/2000 | Bird et al. ............. 375/132 |
| 6,311,078 | B1 | * | 10/2001 | Hardouin .............. 455/567 |
| 6,389,287 | B1 | * | 5/2002 | Smith et al. ............ 455/445 |
| 6,453,180 | B1 | * | 9/2002 | Endoh et al. ............ 455/567 |
| 6,480,716 | B2 | * | 11/2002 | Salonaho ............... 455/441 |
| 6,496,709 | B2 | * | 12/2002 | Murray ................. 455/569.1 |

* cited by examiner

Primary Examiner—Pablo N. Tran

(57) ABSTRACT

A wireless communications system includes at least one base station for communicating with a mobile unit. A mobile switching center is responsive to the base station and operative for switching calls with a calling party and a mobile unit via the base station. One of at least a mobile switching center or base station includes a processor that is operative for determining the speed of the mobile unit. In response to a call from a calling party to the mobile unit, when the calculated speed is above a threshold, the call is switched to a voice message indicating that a mobile unit operator is traveling and not receiving any calls.

34 Claims, 3 Drawing Sheets

WIRELESS COMMUNICATIONS SYSTEM AND METHOD WITH IMPROVED SAFETY FEATURE FOR PREVENTING CALLS TO MOBILE UNIT WHEN TRAVELING

FIELD OF THE INVENTION

This invention relates to wireless communication systems, and more particularly, this invention relates to improved safety features for wireless communication systems.

BACKGROUND OF THE INVENTION

Cellular phones are becoming ubiquitous throughout the United States and many other nations. With the advent of low cost base stations, mobile switching centers and cellular phones, an integrated wireless communications infrastructure is easily implemented, even in poorer third world countries. There has been a recent spate of accidents, however, attributed to cellular phone users who are talking on a cellular phone while driving a motor vehicle at the same time. Unless laws are passed that make driving and talking on the cellular phone at the same time a crime, it will be difficult to stop cellular phone users from talking on their phones and driving at the same time. Also, even if any laws were passed that banned simultaneous driving and talking on a cellular phone, it would be difficult to enforce the law. Law enforcement personnel would be required to maintain a steady watch for drivers that are talking on their cellular phones. This has made it necessary for a feature to be developed that reduces these accidents. Advantageously, it would increase safety by enabling the driver an option of choosing beforehand whether or not to receive an incoming call while he/she is driving. Turning on this feature allows the driver to not receive any incoming calls while driving a motor vehicle such that the driver does not succumb to the impulse to pick up a ringing phone to answer a call. Also, the service should be able to prevent a call if laws are passed without any option by the driver, a mobile unit operator, or owner.

SUMMARY OF THE INVENTION

The present invention is advantageous and increases safety by switching a call to a voice message indicating that a mobile unit operator is traveling and not receiving any calls. This option is preferably responsive to a call from a calling party to the mobile unit when a calculated velocity or speed of the mobile unit is above a threshold. For example, if a driver is only driving in slow traffic, then the call can go through because the driver is not above the velocity threshold. It would be safe to receive a call. If the driver is above the velocity threshold, such as driving on a highway, then the call will automatically be switched by either one of the mobile switching center or base station into a voice message, a voice indicating that the mobile unit operator is traveling and not receiving any calls.

In one aspect of the present invention, the wireless communication system includes at least one base station in communication with the mobile unit. A mobile switching center is responsive to the base station and operative for switching calls with the calling party and the mobile unit via the base station. One of at least the mobile switching center or base station includes a processor that is operator for determining the speed, i.e., velocity, of the mobile unit. In response to a call from a calling party to the mobile unit, when the calculated speed is above a threshold, the call is switched to a voice message indicating that a mobile unit operator is traveling and not receiving any calls.

In one aspect of the present invention, the mobile switching center includes a processor and an associated voice unit, such as a voice response unit, having a database of recordings containing at least one voice message indicating that the operator of the mobile unit is traveling and not receiving any calls.

In yet another aspect of the present invention, the call is switched to the voice message only when a service for switching the call to the voice message is selected by a mobile unit operator. The mobile unit operator can select a service for switching the call to the voice messages based upon keypad actuation within a handset of the mobile unit.

The mobile switching center and base station can be operative to forward a call from a calling party to the mobile unit after a predetermined number of calls and after initially playing the voice message indicating that the mobile unit operator is traveling and not receiving any calls. The predetermined number of calls can be one call and could be made after a predetermined time period has elapsed, such as five seconds.

At least the mobile switching center or base station can be operative for recording a voice message from a mobile unit operator in the voice of the mobile unit operator. The processor in one of at least a mobile switching center or base station can be operative for calculating the speed of the mobile unit by measurements of the rate of change of the timing advance, hand over measurements between a plurality of base stations, Time Difference of Arrival measurements, or Doppler frequency measurements.

In a method aspect of the invention, calls are prevented to a mobile unit when traveling for safety and comprises the steps of determining the speed of a mobile unit, and when the calculated speed is above a threshold, switching a call from a calling party and to a voice message indicating that the mobile unit operator is traveling and not receiving any calls. These calls are switched only after the mobile unit operator selects a service for switching the call to the voice message. A location register, such as a home location register, can maintain a record within the register of whether a mobile unit operator has selected this service for switching the call to the voice message. The mobile unit operator can select the service by keypad actuation.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and now provides a wireless communication system and method that addresses the growing problem of a recent number of accidents attributable to cellular phone users who are talking on their cellular phone while driving a motor vehicle. The present invention can reduce the number of accidents and increase safety by enabling the cellular network or the mobile unit operator the option of choosing beforehand whether or not to receive an incoming call while the operator is driving the vehicle at a velocity or speed above a predetermined threshold. When the mobile unit operator turns on this feature, such as by depressing a keypad button or other means, no incoming calls are received while driving a motor vehicle, and thus, they do not succumb to the impulse to pick up a ringing phone to answer a call.

The invention is operative such that when a call from a calling party is received and addressed to the mobile unit, and the calculated speed is above a threshold, the call is switched to a voice message, such as contained in a database of part of a voice response unit, or other voice unit with a database of voice recordings, or other means as known to those skilled in the art, indicating that a mobile unit operator is traveling and not receiving any calls.

Figure 1:
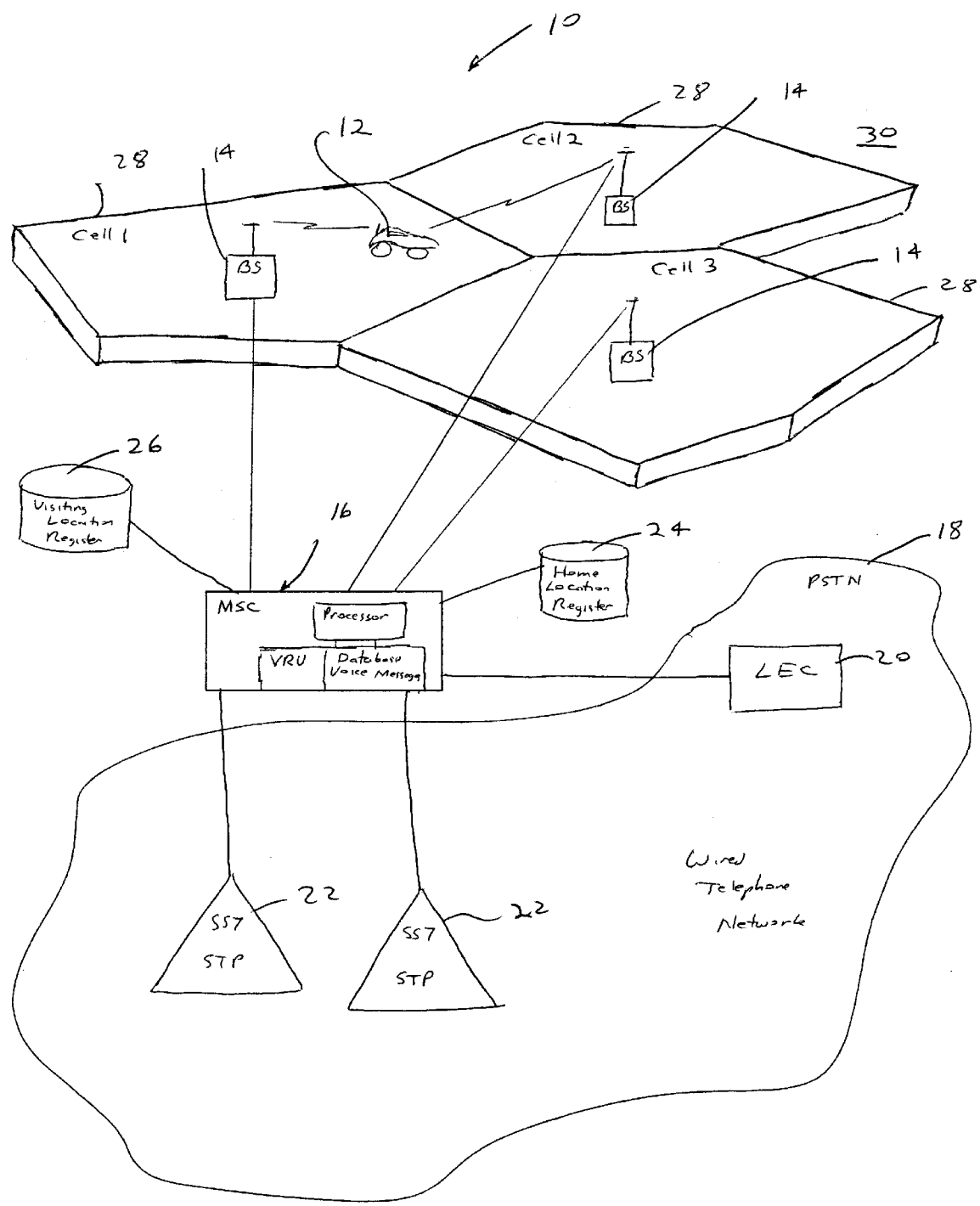
FIG. 1 is an overall view of the system architecture for a cellular system of the present invention.
Figure 2:
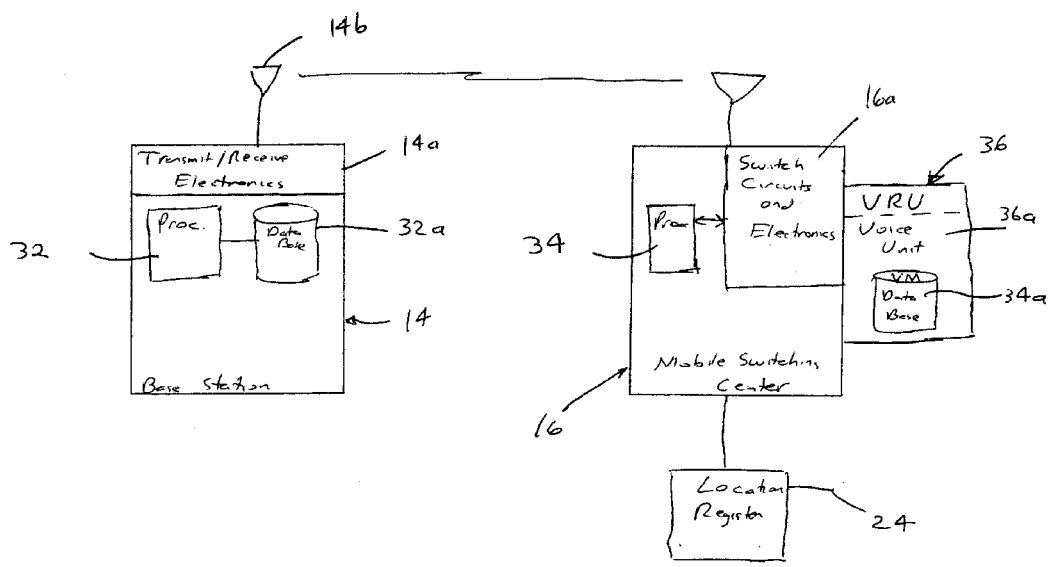
FIG. 2 is a high level block diagram showing basic components of a mobile unit, base station and mobile switching center, which include the features of the present invention.
Figure 2:
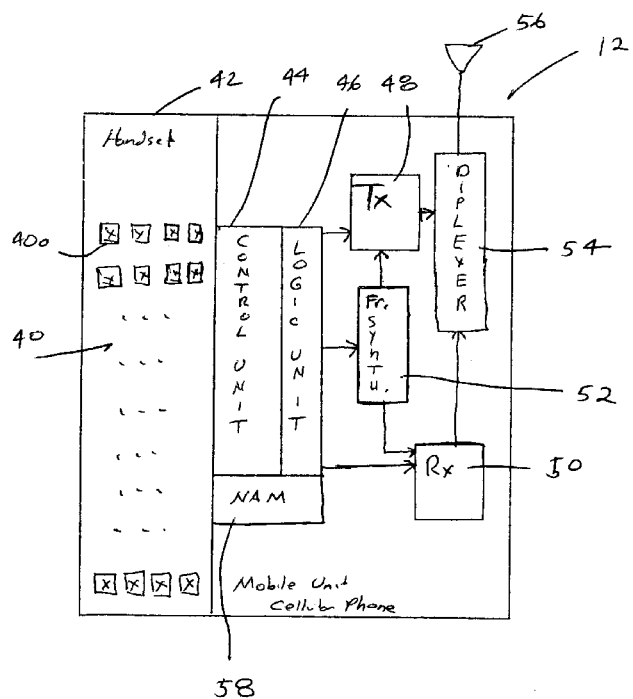

FIG. 1 illustrates a high level diagram of the system architecture for a cellular system 10 that is used in the present invention. The cellular system includes three basic parts, a radio interface, a network infrastructure and an operation support system that is part of the software and other system implementation of the system. As shown in FIGS. 1 and 2, a mobile unit 12 is typically vehicle-mounted or a portable cellular phone, such as the type carried by many users throughout the world. This mobile unit 12 stores the subscriber related information, including identity information, and interfaces with the base stations 14 through wireless communication channels, as known to those skilled in the art.

The base station includes appropriate transmit/receive circuits 14a and antenna system 14b as known to those skilled in the art. A mobile switching center 16 provides for switching, call processing and other subscriber related functions, and wirelessly connects through a base station 14 or a base station controller (not shown) to a mobile unit 12.

The mobile switching center 16 includes appropriate switching circuits and electronics 16a as known to those skilled in the art. A base station controller could interconnect to a number of base stations 14 and provide multiplexing or other controlled cellular functions that are related to the network. The mobile switching center 16 is connected to the public switched telephone network (PSTN) 18 and/or Integrated Services Digital Network (ISDN) transport facilities (not shown), and can connect to local exchange carriers (LEC) 20 and the signaling system 7 network 22 with signal transfer points as STP devices as part of the public switched telephone network 18.

Location register databases are provided and can include a home location register (LHR) 24 and a visiting location register (VLR) 26 that works in conjunction with the home location register 24. These registers 24,26 assist in locating a subscriber and delivering a call to the mobile unit 12. Two other databases can be provided, including an authentication center (AC) and an equipment identity register (EIR) as explained below.

The home location register 24 is a database having data relating to the mobile unit 12 and facilitates mobility by keeping track of permanent and temporary data for the mobile unit. This data can include subscriber data including the mobile unit's access capabilities and service profile, and any basic or supplementary services. It could also provide information about roaming. Typically, a number of cells 28 are grouped together in a location area 30 (FIG. 1) and a location area identity is registered in the visiting location register 26, and stored in the home location register 24.

The visiting location register 26 would maintain information about the location and service for any mobile units entering a coverage area and works extensively as a dynamic database with extensive data exchange with the home location register 24. An authentication center could store the different authentication and encryption parameters to validate a subscriber and protect any mobile units and call processing through the interface. The equipment identity register could maintain records associated with the identity of any mobile units, including an international mobile equipment identity (IMEI).

As shown in FIG. 2, greater details of the mobile unit 12, base station 14 and mobile switching center 16 are illustrated. In accordance with the present invention, one or both the base station 14 and mobile switching center 16 can include a respective processor 32,34 that is operative with an associated database 32a,34a of voice messages, and switches those calls originating from a calling party to the mobile unit into a voice message contained in the database by techniques known to those skilled in the art. One of at least a mobile switching center 16 or base station 14 is operative via the processor 32,34 and associated speed determination circuits and determines by algorithm techniques known to those skilled in the art the speed or velocity of the mobile unit. When the calculated speed is above a threshold, the base station or mobile switching center switches the call to the voice message, indicating that a mobile unit operator is traveling and not receiving any calls. Although the base station is illustrated as having a processor 32 and a database 32a of voice messages, in a preferred aspect of the invention, the mobile switching center would be operative with its processor 34 and database 34a, which could be part of a voice response unit 36 or other means having a voice unit 36a that contains the voice messages and includes, in some aspects, appropriate means for recording messages, such as by the mobile unit operator.

Different techniques, as known to those skilled in the art, can be used for calculating the speed, i.e., velocity, of a mobile unit. One method for calculating the speed includes a system that measures the rate of change of the timing advance to estimate the speed of a mobile unit of a mobile system. For example, some mobile stations could receive a timing advance between zero and another predetermined number, depending on the distance from the cell. If this timing advance increases or decreases continuously during the call, then the mobile unit is moving and the rate of change of the timing advance is proportional to the speed of the mobile unit.

Another speed measurement system uses hand over timers, where call statistics can be gathered and related to when a mobile unit hands in or out of a cell, and the length of time a mobile unit spends in one cell. Based on the distance between the cells, statistics could form the basis of a hierarchical cell structure decision. Thus, it is possible to measure the rate at which a mobile unit is entering and leaving cells and categorize movement as fast or slow for the mobile unit.

Another speed measurement system uses locating techniques, such as Time Difference Of Arrival (TDOA) that works typically in conjunction with a Global Positioning System (GPS). Triangulation techniques employed with multiple base stations pinpoint the geographic location of a mobile unit. Once the geographic location of a mobile unit is determined, the rate of change of its location is measured and the speed of the mobile unit determined.

Yet another speed measurement system that can be used employs Doppler frequency measurements. For example, many of the mobile units, base stations and mobile switching centers have advanced oscillators and filters that permit accurate measurement of the Doppler shift based upon the particular frequency allotted to the mobile unit during a call. A base station receiver as part of the transmit/receive electronics 14a can work in conjunction with a mobile switching center or alone, and be tuned to "listen" for a particular frequency and determine the Doppler shift, and thus, the processor 34a determines the speed of the mobile unit.

Once speed or velocity of the mobile unit is determined, any incoming call can be switched to a voice message at the mobile switching center or base station when the calculated velocity of the mobile unit is above a predetermined threshold. This threshold could vary depending on the cell location area. For example, if the mobile unit is traveling within a large metropolitan area, then the velocity threshold could be about 10 mph. In country areas outside large metropolitan areas, the threshold could be a greater velocity, such as 40 mph. The mobile switching center (or base station in some aspects) can switch the call either automatically or after the mobile unit operator activates a service for switching the call to the voice message. This service could be user activated by actuating a keypad sequence or one key on keypad 40 in the handset 42 of the mobile unit, such as shown in FIG. 2.

The mobile unit includes standard components, such as the keypad 40, contained in the handset 42. The keypad includes a number of individual keys 40a that are operative with a control unit 44 and logic unit 46, as known to those skilled in the art. Logic unit is operative with the transmitter 48, receiver 50 and frequency synthesizer 52. The transmitter 48 and receiver 50 are operative with a diplexer 54 that connects into the antenna 56. A separate chip, or a circuit as part of the control unit and logic unit is formed as a Number Assignment Module (NAM) 58 and provides a 32-bit binary sequence, for example, as an electronic fingerprint for the mobile unit.

As known to those skilled in the art, a transmitter typically is a low-power FM unit having a number of transmit channels in the cellular carrier frequency range. The carrier is furnished by the frequency synthesizer and phase modulated by a voice signal, producing a deviation of a predetermined kilohertz. An automatic power control circuit can be used. The receiver is typically a dual-conversion superheterodyne with various intermediate frequency and oscillator circuits, as known to those skilled in the art. The frequency synthesizer uses typical phase locked loop circuits and mixer circuits, and in some instances, a crystal controlled oscillator to provide reference for the phase locked loop circuits. A voltage controlled oscillator can be included.

A logic unit contains master control circuitry for the cellular radio and includes a microprocessor with both RAM and ROM. The number assignment module is typically contained in a programmable read-only memory and contains the mobile identification number (MIN), corresponding to the telephone number assigned to the unit. This is typically burned into the cellular phone when it is purchased. A control unit contains the handset with the speaker and microphone, as known to those skilled in the art.

For example, activating a certain key or sequence of keys 40a on the keypad 40 could initiate the control and logic units 44,46 that transmit a signal from the antenna to the base station and mobile switching center indicating a code that the service of the present invention should be operative. A record could be contained in the home location register 24 indicating that the mobile unit operator has switched on the service. When the calculated velocity of the mobile unit is above a predetermined threshold, any incoming calls are switched into the voice message.

It is also possible that the mobile switching center 16 or base station 14 is operative to forward a call from a calling party to the mobile unit after a predetermined number of calls and after initially playing the voice message, indicating that the mobile unit operator is traveling and not receiving any calls. For example, if the caller considers his/her call an emergency, the caller could call back a second time after a predetermined time period, for example, five or ten seconds, and the call would be switched directly to the mobile unit. This could occur after a predetermined number of calls, such as one call or two calls, and after a predetermined time period. The mobile switching center or base station can be operative for playing back a recording of a voice message in the voice of the mobile unit operator or having a machine recorded voice message.

Figure 3:
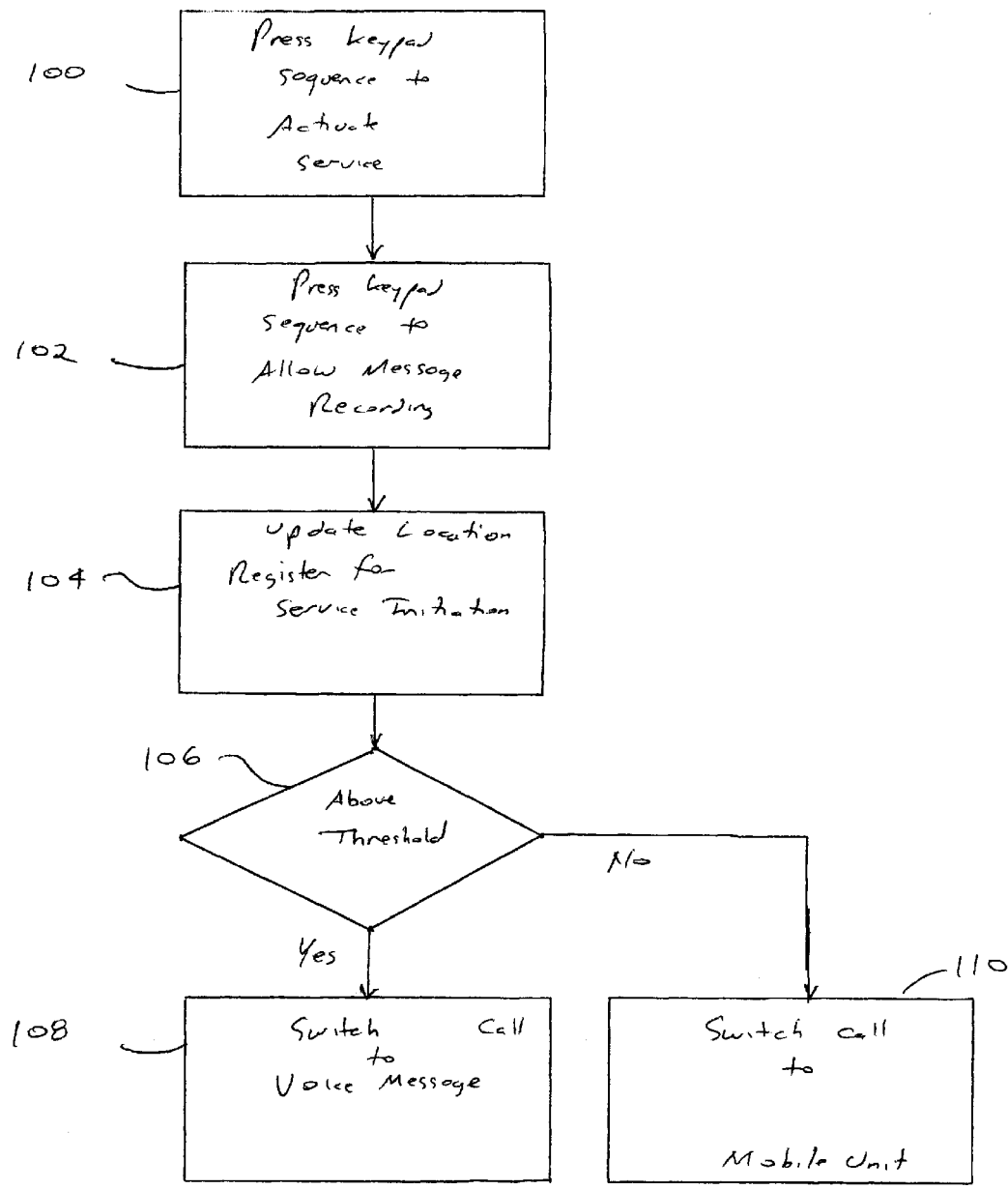
FIG. 3 is a flow chart illustrating a method of operation of the present invention.

FIG. 3 illustrates the basic flowchart of the operation of the present invention, wherein at the first step at block 100, a mobile unit operator initially presses a keypad sequence to activate the service as noted above. Another sequence of keypad actuations (block 102) could allow the mobile unit operator to access a voice response unit having a voice unit that allows the user to record voice messages and/or rerecord, or record a new message if the mobile unit operator is a first time user. The mobile switching center updates the various home or visiting location registers (block 104) to indicate that the mobile unit operator has selected the particular service of the present invention. Alternatively, the wireless network system acting through the various processors can automatically calculate velocity of any mobile unit and, based upon the velocity calculations, automatically switch any incoming calls to the voice unit (to play back a message).

Once the mobile unit operator has activated the service, the processor determines if the velocity is above a predetermined threshold (block 106). If above the threshold, an incoming call is switched to the voice unit and into the voice message (block 108). If the velocity is not above the predetermined threshold, the call is switched to the mobile unit to be received by the mobile unit operator (block 110).

As noted before, the incoming call could be redirected to the recorded message that could be in the mobile unit operator's own voice. A typical voice message, whether that of the operator or a machine, could state:

"As I am currently driving an automobile, I have chosen not to receive any incoming calls presently. However, if you think that this is an emergency, please dial the number again and I will answer your call. Thanks. Have a great day."

As noted before, this option can be selected by the mobile unit operator or work automatically if there are laws passed that do not allow a mobile unit operator to use a mobile unit, e.g., cellular phone, while driving.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A wireless communications system comprising:
   at least one base station in communication with a mobile unit; and
   a mobile switching center responsive to the base station and operative for switching calls with a calling party and the mobile unit via the base station, wherein one of at least said mobile switching center or base station includes a processor that is operative for determining the speed of the mobile unit, and responsive to a call from a calling party to the mobile unit, when the calculated speed is above a threshold, switching the call to a voice message indicating that a mobile unit operator is traveling and not receiving any calls wherein said mobile switching center and base station are operative to forward a call from a calling party to the mobile unit after a predetermined number of calls and after initially playing the voice message indicating that a mobile unit operator is traveling and not receiving any calls.

2. A wireless communication system according to claim 1, wherein said call is switched to the voice message only when a service for switching the call to such voice message is selected by a mobile unit operator.

3. A wireless communication system according to claim 2, wherein said mobile unit operator selects a service for switching the call to a voice message based upon keypad activation within a handset of the mobile unit.

4. A wireless communications system according to claim 1, wherein said predetermined number of calls is one call.

5. A wireless communication system according to claim 1, wherein one of at least said mobile switching center or base station is operative for recording a voice message from a mobile unit operator in the voice of the mobile unit operator.

6. A wireless communication system according to claim 1, wherein said processor in one of at least said mobile switching center or base station is operative for calculating the speed of a mobile unit by measuring the rate of change of the timing advance.

7. A wireless communication system according to claim 1, wherein said processor in one of at least said mobile switching center or base station is operative for calculating the speed of a mobile unit by calculating handover measurements between a plurality of base stations.

8. A wireless communication system according to claim 1, wherein said processor in one of at least said mobile switching center or base station is operative for calculating the speed of a mobile unit by measuring Time Difference of Arrival.

9. A wireless communications system according to claim 1, wherein said processor in of at least said mobile switching center or base station is operative for calculating the speed of a mobile unit by calculating Doppler frequency.

10. A wireless communications system according to claim 1, and further comprising a location register operatively connected to the mobile switching center for maintaining a record of when any calls be switched to the voice recording.

11. The system of claim 1, wherein the call is forwarded to the mobile unit when the same calling party places the predetermined number of calls.

12. A wireless communications system comprising:
    at least one base station in communication with a mobile unit; and
    a mobile switching center responsive to the base station and operative for switching calls with a calling party and the mobile unit via the base station, wherein said mobile switching center further comprises
        a processor that is operative for determining the speed of the mobile unit;
        a voice unit having a database of recordings containing at least one voice message indicating that the operator of the mobile unit is traveling and not receiving any calls;
    wherein when the calculated speed is above a threshold, said mobile switching center is responsive to a call from a calling party to the mobile unit and switching said call into the voice unit and playing the voice message indicating that a mobile unit operator is traveling and not receiving any calls wherein said mobile switching center and base station are operative to forward a call from a calling party to the mobile unit after a predetermined number of calls and after initially playing the voice message indicating that an operator of the mobile unit is traveling and not receiving any calls.

13. A wireless communications system according to claim 12, and further comprising a location register for maintaining a record of when any calls be switched into the voice unit.

14. A wireless communications system according to claim 12, wherein said predetermined number of calls is one call.

15. A wireless communication system according to claim 12, wherein said voice unit is operative for recording a voice message from a mobile unit operator in the voice of the mobile unit operator.

16. A wireless communication system according to claim 12, wherein said processor is operative for calculating the speed of a mobile unit by measuring the rate of change of the timing advance.

17. A wireless communication system according to claim 12, wherein said processor is operative for calculating the speed of a mobile unit by calculating handover measurements between a plurality of base stations.

18. A wireless communication system according to claim 12, wherein said processor is operative for calculating the speed of a mobile unit by measuring Time Difference of Arrival.

19. A wireless communications system according to claim 12, wherein said processor is operative for calculating the speed of a mobile unit by calculating Doppler frequency.

20. A wireless communications system according to claim 12, wherein said call is switched to the voice message only when a service for switching the call to the voice message is selected by a mobile unit operator.

21. A wireless communication system according to claim 20, wherein said mobile unit operator selects such service based upon keypad activation within a handset of the mobile unit.

22. The system of claim 12, wherein the call is forwarded to the mobile unit when the same calling party has placed the predetermined number of calls.

23. A method of preventing calls to a mobile unit when traveling for safety comprising the steps of:
    determining the speed of a mobile unit;
    when the calculated speed is above a threshold, switching a call from a calling party and to a voice recording indicating that the mobile unit operator is traveling and not receiving any calls; and
    forwarding a call from a calling party to the mobile unit after a predetermined number of calls after the voice message is initially played.

24. A method according to claim 23, and further comprising the step of switching the call to the voice message only after the mobile unit operator selects a service for switching the call to the voice message.

25. A method according to claim 24, and further comprising the step of maintaining a record within a location register of whether a mobile unit operator has selected a service for playing the voice message.

26. A method according to claim 24, and further comprising the step of selecting the service by keypad actuation.

27. A method according to claim 23, wherein the predetermined number of calls is one call.

28. A method according to claim 23, and further comprising the step of recording the voice message using the voice of the mobile unit operator.

29. A method according to claim 23, and further comprising the step of calculating the speed of the mobile unit by measuring the rate of change of the timing advance.

30. A method according to claim 23, and further comprising the step of calculating the speed of the mobile unit by measuring handovers between a plurality or base stations.

31. A method according to claim 23, and further comprising the step of calculating the speed of the mobile unit by measuring Time Difference of Arrival.

32. A method according to claim 23, and further comprising the step of calculating the speed of the mobile unit by measuring Doppler frequency shifts.

33. A method according to claim 23, and further comprising the step of recording the voice message within a recording database of a voice unit.

34. The method of claim 23, including forwarding the call to the mobile unit when the same calling party placed the predetermined number of calls.

* * * * *